Figure 1:
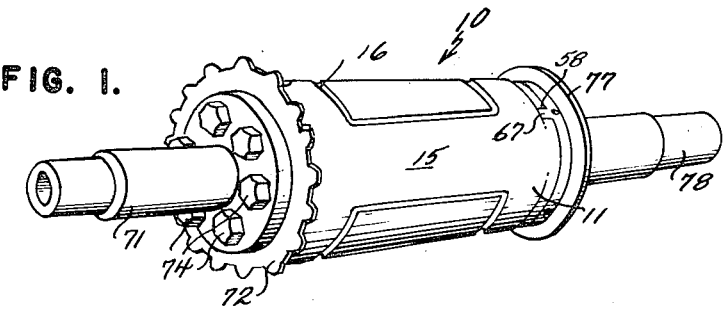

July 3, 1956　　　　　T. W. WINSTEAD　　　　2,752,632
MOLD FOR THERMOPLASTIC MATERIALS
Filed Feb. 19, 1952　　　　　　　　　　　2 Sheets-Sheet 1

INVENTOR
THOMAS W. WINSTEAD

BY *Semmes, Keegin, Robinson & Semmes*
ATTORNEYS

July 3, 1956
T. W. WINSTEAD
2,752,632
MOLD FOR THERMOPLASTIC MATERIALS
Filed Feb. 19, 1952
2 Sheets-Sheet 2
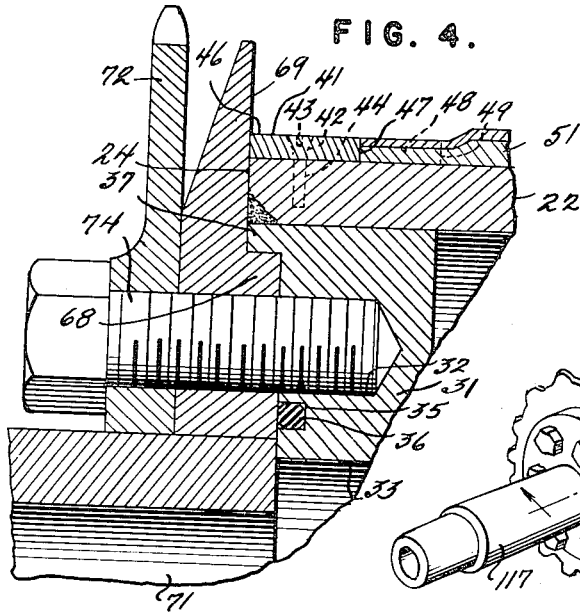
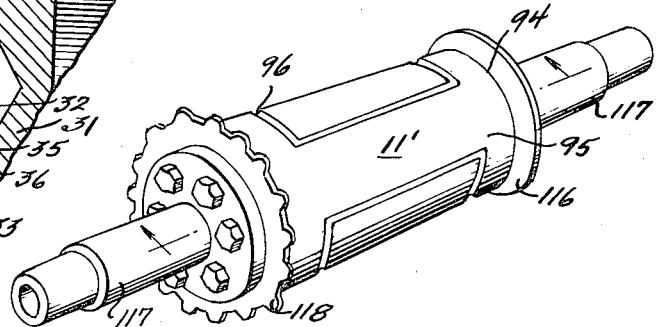
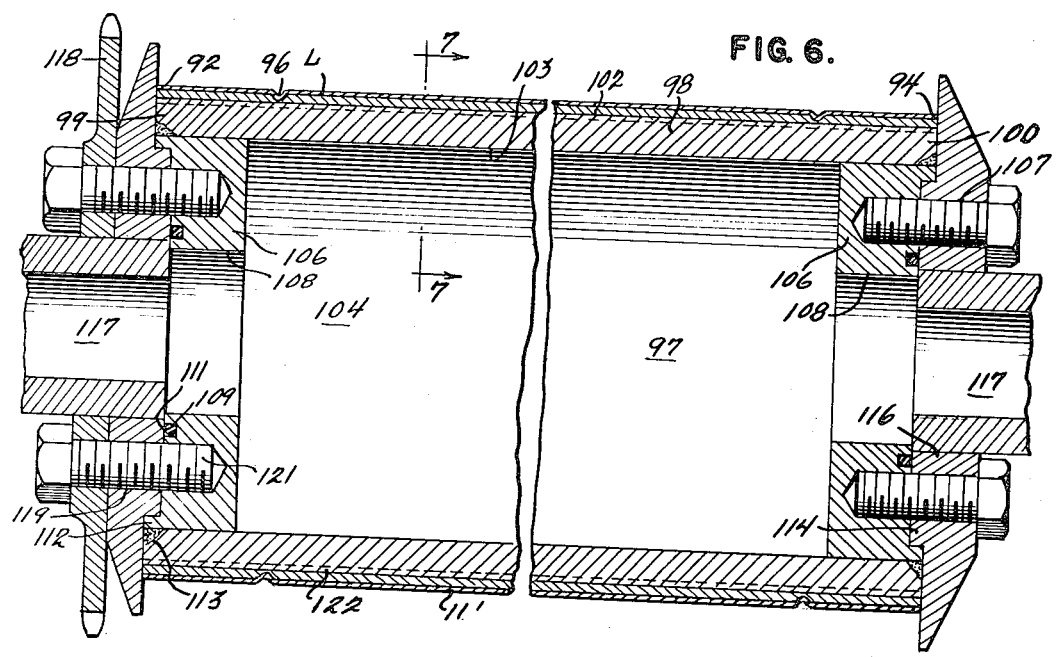
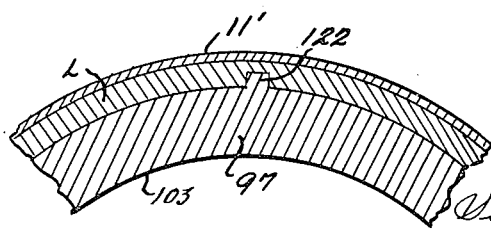
INVENTOR
THOMAS W. WINSTEAD
BY Semmes, Keegin, Robinson & Semmes
ATTORNEYS

United States Patent Office 2,752,632
Patented July 3, 1956

2,752,632

MOLD FOR THERMOPLASTIC MATERIALS

Thomas W. Winstead, Baltimore, Md., assignor to Hedwin Corporation, Baltimore, Md., a corporation of Maryland Application February 19, 1952, Serial No. 272,470

6 Claims. (Cl. 18—10)

This invention relates to molds for thermoplastic materials, and more particularly to molds for continuously deep-embossing thermoplastic sheet material, such, for example, as those formed in accordance with the method disclosed in my copending application Serial No. 272,469, filed concurrently with the present application.

In the manufacture of thermoplastic sheets, it has been a practice in some instances to decorate said sheets by subjecting them to dies which impart to the sheet a decorative surface. It has been useful to subject said sheets to relatively high temperatures in order sufficiently to soften same to receive such decoration. Heretofore, when such embossing has been accomplished, the sheets have been subjected to embossing successively with a result that products of considerable attractiveness have been obtained but of somewhat variant quality and at relatively high unit cost. It is apparent that if such a decoration could be accomplished on a continuous basis, not only would the volume of production be markedly increased and the cost of production correspondingly decreased, but there would result an additional benefit in that the elements produced would be identical and of uniform standard. Various molds have been utilized heretofore for producing thermoplastic items, and as shown by my pending U. S. Patent application Serial No. 268,236, filed January 25, 1952, and now abandoned, considerable effort has been directed toward deep embossing relatively thick thermoplastic sheets with designs having depth extending from less than ¼ inch to in excess of one inch, and successful steps have been directed toward manufacturing decorative plastic forms by deep embossing. In the practice of my invention pertaining to decorating with deep embossing, the greater depth has successfully been employed to yield production of excellent appearance and marketability. However, a substantial portion of the market for embossed plastics requires deep embossing with depth of less than ¼ inch. It will be apparent, however, that quality production of three-dimensional deep embossing on thermoplastics utilizing depth of less than ¼ inch or more requires regard for the detailed nature of the design embossed thereon, and major emphasis therefore is to be placed upon the fine detail of the deep embossed decoration.

It is a primary object of the invention to provide a mold suitable for the continuous deep embossing of thermoplastic sheets which will be durable, economical and efficient.

It is another object of my invention to provide for the continuous production of deep embossed thermoplastic material by a mold simple in design and reliable to produce a product which will be highly accurate as a facsimile of an original.

It is another object of this invention to provide a rotary mold for deep embossing thermoplastics with a design from a flat original and which will have a high fidelity and durable curved molding face for the production of flat facsimiles.

It will be another object of the invention to provide for the continuous production of deep embossed vinyl sheet material which will provide a complete high fidelity facsimile without waste.

Figure 2:
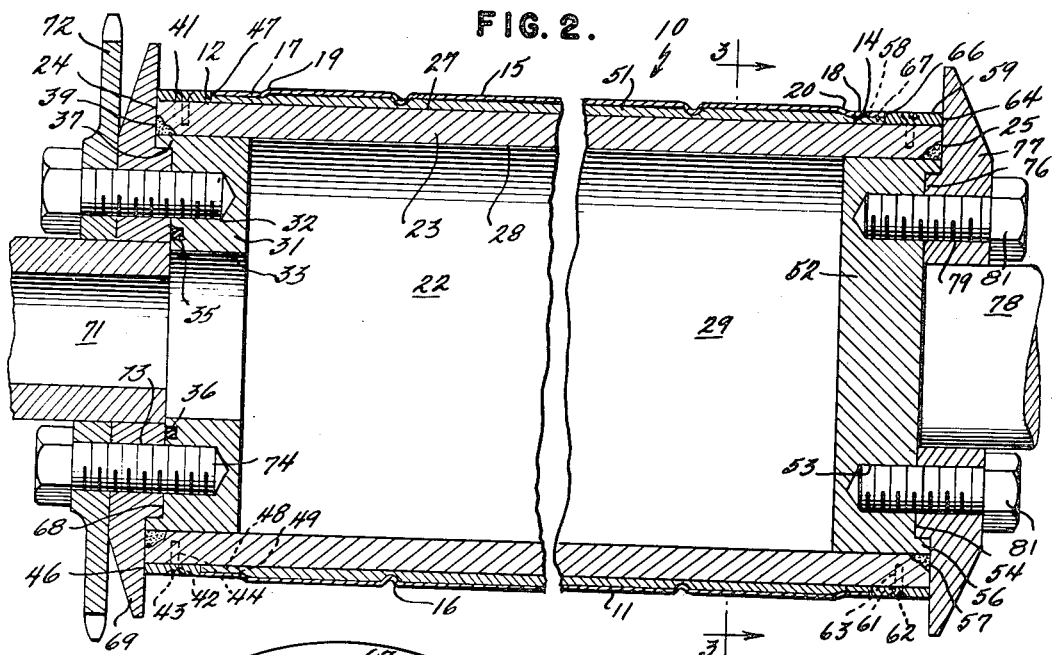
Figure 3:
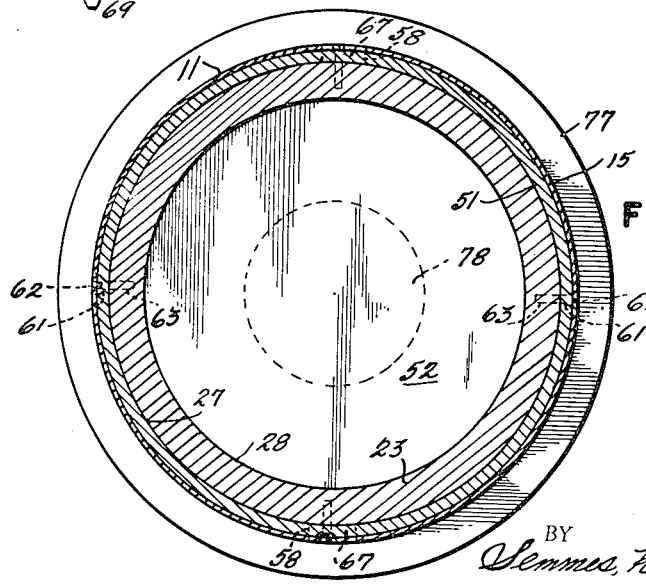

The additional objects and advantages of the invention will be understood by referring to the following detailed description including the drawings, wherein:

Figure 1 is a perspective view of a mold;
Figure 2 is an enlarged transverse section of the mold shown in Figure 1;
Figure 3 is a section taken on the line 3—3 of Figure 2;
Figure 4 is a view enlarged showing details of the hub assembly of Figure 2;
Figure 5 is a perspective view of a modified form of mold;
Figure 6 is an enlarged transverse section of the mold of Figure 5; and
Figure 7 is a section taken on the line 7—7 of Figure 6.

In the preferred practice of the invention, the mold has a surface minutely corresponding to a design original from which it is taken as an electro-deposit, said electro-deposit being firmly backed up and mounted to complete a driven mold roll having lateral selvage producing areas to enable trimming of the product without impairing the facsimile effect.

Although the mold may be so made as to reproduce, by embossing, any normally flat article having a surface decorated in relief, in the present example it may be supposed that the product is a vinyl thermoplastic table place mat facsimile of a linen table place mat having a raised embroidered design and unfinished in that it has lateral selvage areas. The linen original being for example 18 inches long by 14 inches wide, such selvage allowance will enable an inch to be trimmed from each side after molding it to finish the thermoplastic pallet.

Mold roll 10 has a working face consisting of a seamless, cylindrical electroplate 11 characterized, as shown in Figure 2, by opposite circular edges 12 and 14 and an intermediate peripheral design area 15 constituting a high fidelity reverse relief facsimile of the upper surface of a rectangular linen or other original (not shown). The face design area 15 has a groove 16 rectangular if projected, caused by corresponding raised embroidery of the original.

The electroplate also includes opposite areas 17 and 18 which are below the plane of design face 15. The outer areas define lateral peripheral shoulders 19 and 20 respectively which de-limit the design area of the face 15. The outer surface of the electroplate being of the above essential quality, it will be understood that the interior surface thereof may be without specific finish. The electroplate is provided with a tubular core 22 having a wall 23 of considerable thickness rotatably to withstand relatively high molding pressures as of the order of 1000 pounds per square inch. The electroplate is preferably uniformly of greater internal diameter than core 22, the latter constituting not only a strong support for the electroplate but also a shaft for rotating the electrodeposited mold face thereof.

Core 22 has one end 24 and an opposite end 25 spaced by outer surface 27 and inner surface 28. Its axial bore 29 is partially closed at one end by wall 31 having outward spaced recesses 32, six in number. Wall 31 has an axial bore 33 communicating with bore 29, and an outward annular recess 35 accommodating O-ring 36 concentric with peripheral outward flange 37 fixed by annular weld 39 within steel core 22. Core end 24 is surrounded by a steel band 41 preferably shrunk thereon and having spaced holes 42, 42 for radial fastening screws 43, 43 fast in holes 44, 44 in core wall 23. Band 41 is attached so that its outer edge 46 is flush with end 24, its inner edge 47 having a pair of diametrically disposed rectangular lugs 48, 48 which fit in corresponding recesses 49, 49 in the outer area 17 of the electroplate and lead alloy backing 51. It will be understood that lead alloy backing 51 is poured to fill all the area between the outer surface of core 22 and the inner surface of the electroplate. At its opposite end, core 22 is closed by end wall 52 concentric with end wall 31 and having outward spaced recesses 53, 53, preferably six in number, and an outward annular recess 54 concentric with outward flange 56 fixed by annular weld 57 within steel core 22.

A pair of rectangular recesses 58, 58 are located diametrically in outer area 18 of the electroplate and the lead backing. A band 59, corresponding to band 41, is then shrunk with a tight fit upon shaft end 25 and has holes 61, 61 for receiving screws 62, 62 fast in holes 63, 63 formed radially in core 22. Outer edge 64 of band 59 is flush with shaft end 25, and its inner edge 66 includes diametrically disposed rectangular lugs 67, 67 which engage in the corresponding recesses 58, 58 in the copper and lead layers.

The mold is mounted at each end for actuation by means of face disc 68 on hub or coupling plate 69 fast to one end of hollow shaft 71, said shaft interiorly constituting a source of fluid temperature control for the mold, as providing hot or cold water supply for a U-siphon circuit conveniently connected therewithin. Externally hollow shaft 71 may be provided with sprocket drive 72 connected to any suitable source of power drive (not shown) to rotate the mold in continuous production. Hub plate 69 is provided with holes 73, 73 for receiving bolts 74, 74 threading into wall recesses 32 and also securing sprocket 72. By reference to Figure 2, it will be apparent that when the bolts 74 are taken up and firmly secured in recesses 32, face disc 68 will seat sealingly within peripheral flange 37 and upon O-ring 36, and hub 69 will seat against end 24 of steel core 22, projecting radially therebeyond to form a rectifying flange for the mold. Correspondingly at the opposite end of the mold, face disc 76 on hub 77 fast on shaft 78 rotatable in any fixed journal (not shown) may be attached securely to the mold, spaced holes 79, 79 being provided in coupling plate or hub 77 to receive bolts 81, 81. When said bolts are tightened in wall recess 53, 53 the face disc 76 will seat within flange 56, coupling plate or hub 77 being fixed to end 25 to provide radially therebeyond a work defining flange corresponding to opposite hub 69. The lateral work defining flange constitutes an important aspect of the present invention. Thus, it will be observed, if the vinyl or other thermoplastic subjected to the mold roll is introduced with width corresponding to the distance between the hubs and under pressure, air will escape rearwardly, the plastic being pressed between the mold roll forwardly and hub flanges laterally of embossing roll 10.

The described construction also ensures that the electroplate and its lead backing will remain rigidly interconnected to core 22, this being accomplished by the lateral lug engagements which prevent rotary slipping under high working pressures and the hubs prevent lateral slipping of electroplating on roll 10.

It will be understood that the invention is not limited to any particular metal or combination of metals. In the present design the electroplate is formed of copper but it may be electrodeposited of nickel or other suitable metal. Preferably for backing up metal alloy such as that used in the electrotyper's industry is employed. The assembled construction of electrodeposit upon the core provides an integrated assembly and good contact therebetween which ensures adequate heat exchange for either heating or cooling the mold by circulating fluid through the core. In the preferred form of the invention circulation, as indicated above, is obtained by a U-siphon circuit suitably connected in any suitable manner (not shown). However, such temperature controlling fluid circulation may be obtained by other means such as that disclosed in a modified form of the invention.

Referring to Figures 5, 6 and 7, the tubular electroplate 11' has a mold face characterized by opposite circular edges 92 and 94 and an intermediate peripheral design area 95 constituting a high fidelity reverse relief facsimile of the upper surface of any linen or other flat original (not shown). Such electroplate has central face design area 95 with a groove 96 rectangular if projected caused by corresponding raised embroidery of the original. The core is centered concentrically with the electroplate, having a wall 98 of considerable thickness rotatably to withstand relatively high molding pressures as of the order of 1000 pounds per square inch. The electroplate is preferably uniformly of greater internal diameter than core 97, the latter constituting not only a strong support for the electroplate but also a shaft for rotating same.

Core 97 has one end 99 and an opposite end 100 spaced by outer surface 102 and inner surface 103. Its axial bore 104 is partially closed at each end by walls 106, each having outward spaced recesses 107, six in number. Each wall 106 has an axial bore 108 communicating with bore 104, and an outward annular recess 109 accommodating O-ring 111 concentric with peripheral outward flange 112 fixed by annular weld 113 within steel core 97.

The mold is mounted at each end for actuation by means of face disc 114 on hub 116 fast to one end of hollow shaft 117, said shaft interiorly constituting a source of fluid temperature control for the mold, as providing hot or cold water supply for a conveniently connectable circuit (not shown). Externally hollow shaft 117 may be provided with sprocket drive 118 connected to any suitable source of power drive (not shown) to rotate the mold in continuous production. Hub 116 is provided with holes 119 for receiving bolts 121 threading into wall recesses 107 and also securing sprocket 118. By reference to Figure 6, it will be apparent that when the bolts 121 are taken up and firmly secured in recesses 107, face disc 114 will seat sealingly within peripheral flange 112 and upon O-ring 111, and hub 116 will seat against the end of steel core 22, projecting radially therebeyond to form work defining flanges for the mold. Upon the vinyl or other thermoplastic being subjected to this mold roll, air will escape rearwardly as the plastic is compressed between the mold roll forwardly and the lateral hub flanges.

In the modified form, electro-deposit 11 and its lead alloy backing are fixed against rotary slippage by transverse fin 122 preferably integral with the periphery of the core 97.

While the modified form primarily is designed for molding without the selvage or waste areas, it will be understood that practical production and efficient employment of the apparatus may be had by molding products with or without selvage or waste edges on either form.

From the foregoing it will be apparent that the modified and preferred forms of the invention provide simple and durable constructions for continuously deep-embossing the vinyl or other thermoplastic sheet with high fidelity designs originally embroidered or otherwise brought up in relief on surfaces being imitated.

I claim:
1. An embossing roll for continuously forming thermoplastic sheets with predetermined relief characteristics, comprising a hollow cylindrical core, end walls fixed in said core, an endless cylindrical electroplate assembly overlying the periphery of said core, said electroplated surface having a design forming pattern thereon and integral lateral peripheral portions below the plane of the pattern devoid of design and forming selvage producing areas adjacent the pattern area and lateral peripheral shoulders delimiting the pattern area, interlocking means carried respectively by said core and said electroplate assembly, to prevent rotary slippage of the lat- ter, end flanges secured to said end walls and extending radially beyond the periphery of said core to serve as work edge defining members and lateral slippage preventing abutments for said electroplate assembly, concentric shaft sections fast to respective end plates, rotatably supporting said core, at least one of said shaft sections being hollow to conduct a temperature controlling fluid, and an inlet opening in the corresponding end plate to admit said fluid to the interior of said core.

2. An embossing roll for continuously forming thermoplastic sheets with predetermined relief characteristics, comprising a hollow cylindrical core, end walls fixed in said core, a seamless, alloy backed cylindrical electroplate assembly overlying the periphery of said bore, said electroplated surface having a design forming pattern thereon and integral lateral peripheral portions below the plane of the pattern devoid of design and forming selvage producing areas adjacent the pattern area and lateral peripheral shoulders delimiting the pattern area, interlocking means carried respectively by said core and said electroplate assembly, to prevent rotary slippage of the latter, end flanges secured to said end walls and extending radially beyond the periphery of said core to serve as work edge defining members and lateral slippage preventing abutments for said electroplate assembly, concentric shaft sections fast to respective end plates, rotatably supporting said core, at least one of said shaft sections being hollow to conduct a temperature controlling fluid, and an inlet opening in the corresponding end plate to admit said fluid to the interior of said core.

3. An embossing roll for continuously forming thermoplastic sheets with predetermined relief characteristics, comprising a hollow, cylindrical core, end walls fixed in said core, an endless alloy backed cylindrical electroplate assembly overlying the periphery of said core, said electroplated surface having a design forming pattern thereon and integral lateral peripheral portions below the plane of the pattern devoid of design and forming selvage producing areas adjacent the pattern area and lateral peripheral shoulders delimiting the pattern area, an annular band encircling each end of said core with its outer edge flush with the corresponding edge of the core, means securing said bands to said core, interlocking means carried respectively by adjacent edges of said electroplate assembly and bands, to prevent rotary slippage of said assembly, end flanges secured to said end walls and extending radially beyond the peripheries of said bands to serve as work edge defining members and lateral slippage preventing abutments for said electroplate assembly, concentric shaft sections fast to respective end plates, rotatably supporting said core, at least one of said shaft sections being hollow to conduct a temperature controlling fluid, and an inlet opening in the corresponding end plate to admit said fluid to the interior of said core.

4. An embossing roll as claimed in claim 2 wherein said slippage preventing means comprises a longitudinally extending fin on the periphery of said core adapted to engage a complementary recess in the adjacent surface of said electroplate assembly.

5. An embossing roll as claimed in claim 4 wherein both of said shaft sections are hollow and including openings in both of said end plates to permit the continuous flow of temperature controlling fluid through said core.

6. An embossing roll for continuously forming thermoplastic sheets with predetermined relief characteristics, comprising a cylindrical core, a continuous, seamless, electroplated surface on the periphery of said core, a central peripheral portion of said surface having a facsimile forming pattern thereon, integral lateral peripheral portions of said surface on either side of said central portion being devoid of design and below the plane of said central portion, said lateral portions extending continuously around said core and forming selvage producing areas adjacent the pattern area and lateral peripheral shoulders delimiting the pattern area and means rotatably supporting said core.

References Cited in the file of this patent

UNITED STATES PATENTS

| | | |
|---|---|---|
| 681,050 | Freschl | Aug. 20, 1901 |
| 889,341 | Shuman | June 2, 1908 |
| 1,539,052 | McCrohan et al. | May 26, 1925 |
| 1,954,635 | Leonard | Apr. 10, 1934 |
| 2,125,859 | Liebett | Aug. 2, 1938 |
| 2,159,543 | Baker | May 23, 1939 |
| 2,323,862 | Zimmerman et al. | July 6, 1943 |
| 2,453,404 | Bohlman et al. | Nov. 9, 1948 |
| 2,514,213 | Mason et al. | July 4, 1950 |